United States Patent [19]
Fuse

[11] Patent Number: 5,467,437
[45] Date of Patent: Nov. 14, 1995

[54] RECORDING APPARATUS

[75] Inventor: Takeshi Fuse, Ebina, Japan

[73] Assignee: Fuji Xerox Co., Ltd., Tokyo, Japan

[21] Appl. No.: 128,133

[22] Filed: Sep. 29, 1993

[30] Foreign Application Priority Data

Oct. 6, 1992 [JP] Japan .................................. 4-293702

[51] Int. Cl.⁶ .................................................. G06K 15/00
[52] U.S. Cl. ........................................... 395/115; 395/108
[58] Field of Search ...................................... 395/114, 101,
395/103, 105, 108, 112, 115, 137; 400/120.05,
120.06, 120.08, 120.1; 347/184–194

[56] References Cited

FOREIGN PATENT DOCUMENTS

| | | |
|---|---|---|
| 58-195357 | 11/1983 | Japan . |
| 58-195358 | 11/1983 | Japan . |
| 58-195359 | 11/1983 | Japan . |
| 58-195365 | 11/1983 | Japan . |

Primary Examiner—Arthur G. Evans
Attorney, Agent, or Firm—Oliff & Berridge

[57] ABSTRACT

A recording apparatus having a head mounted on a carriage moving relatively to a recording medium, the head printing one column substantially perpendicular to the direction in which the carriage moves so as to print a single line. The apparatus comprises a storage device for storing print data in units of bits and for allowing any of the print data to be accessed in units of bits by an X address and a Y address; an X address counter for designating the X address in the storage device; a Y address counter for designating the Y address in the storage device; a mode setting register for storing write mode data; a memory read/write timing controller for generating a plurality of timing signals for writing and reading to and from the storage device; a bus timing controller for outputting print data in units of bits in accordance with the content of the mode setting register upon receipt of print data in units of words; and a selector for supplying any one of the X address counter and the Y address counter with the timing signals in accordance with the content of the mode setting register, the selector further sending a carry signal from the address counter having received the timing signals to the address counter not receiving the timing signals.

9 Claims, 13 Drawing Sheets

COLUMN ADDRESS VALUES

|   | 0 | 1 | | | | | | | | | | | | |
|---|---|---|---|---|---|---|---|---|---|---|---|---|---|---|
| 0 | 1 | 129 | | | | | | | | | | | | |
| 1 | 2 | 130 | | | | | | | | | | | | |
| 2 | 3 | 131 | | | | | | | | | | | | |
| ⋮ | | | | | | | | | | | | | | |
| 127 | 128 | 256 | | | | | | | | | | | | |

ROW ADDRESS VALUES

FIG. 9

COLUMN ADDRESS VALUES

|   | 0 | 1 | 2 | | | | | | | | | 2046 | 2047 |
|---|---|---|---|---|---|---|---|---|---|---|---|---|---|
| 0 | 1 | 2 | 3 | | | | | | | | | 2047 | 2048 |
| 1 | 2049 | 2050 | 2051 | | | | | | | | | 4095 | 4096 |

ROW ADDRESS VALUES

FIG. 10

|        | 1ST BYTE | 2ND BYTE | 3RD BYTE |
|---|---|---|---|
|        | D7 D6 D5 D4 D3 D2 D1 D0 | D7 D6 D5 D4 D3 D2 D1 D0 | D7 D6 D5 D4 D3 D2 D1 D0 |
| 4TH BYTE | D7 D6 D5 D4 D3 D2 D1 D0 | | |
| 7TH BYTE | D7 D6 D5 D4 D3 D2 D1 D0 | | |
| 10TH BYTE | D7 D6 D5 D4 D3 D2 D1 D0 | | |
| 13TH BYTE | D7 D6 D5 D4 D3 D2 D1 D0 | | |
| 16TH BYTE | D7 D6 D5 D4 D3 D2 D1 D0 | | |
| 19TH BYTE | D7 D6 D5 D4 D3 D2 D1 D0 | | |
| 22TH BYTE | D7 D6 D5 D4 D3 D2 D1 D0 | | |
| 25TH BYTE | D7 D6 D5 D4 D3 D2 D1 D0 | | |
| 28TH BYTE | D7 D6 D5 D4 D3 D2 D1 D0 | | |
| 31TH BYTE | D7 D6 D5 D4 D3 D2 D1 D0 | | |
| 34TH BYTE | D7 D6 D5 D4 D3 D2 D1 D0 | | |
| 37TH BYTE | D7 D6 D5 D4 D3 D2 D1 D0 | | |
| 40TH BYTE | D7 D6 D5 D4 D3 D2 D1 D0 | | |
| 43TH BYTE | D7 D6 D5 D4 D3 D2 D1 D0 | | |
| 46TH BYTE | D7 D6 D5 D4 D3 D2 D1 D0 | | |
| 49TH BYTE | D7 D6 D5 D4 D3 D2 D1 D0 | | |
| 52TH BYTE | D7 D6 D5 D4 D3 D2 D1 D0 | | |
| 55TH BYTE | D7 D6 D5 D4 D3 D2 D1 D0 | | |
| 58TH BYTE | D7 D6 D5 D4 D3 D2 D1 D0 | | |
| 61TH BYTE | D7 D6 D5 D4 D3 D2 D1 D0 | | |
| 64TH BYTE | D7 D6 D5 D4 D3 D2 D1 D0 | | |
| 67TH BYTE | D7 D6 D5 D4 D3 D2 D1 D0 | | |
| 70TH BYTE | D7 D6 D5 D4 D3 D2 D1 D0 | D7 D6 D5 D4 D3 D2 D1 D0 | D7 D6 D5 D4 D3 D2 D1 D0 |

FIG.15A

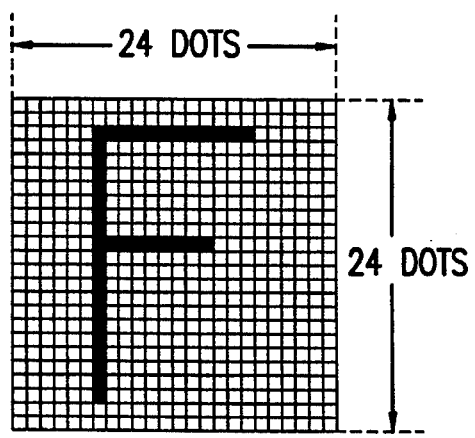

FIG.15B

RECORDING APPARATUS

BACKGROUND OF THE INVENTION

1. Field of the Invention

The present invention relates to a recording apparatus and, more particularly, to a recording apparatus and its peripheral circuits, the apparatus accommodating temporarily the print data to be supplied to a print head.

2. Description of the Prior Art

Diverse kinds of serial recording apparatuses have been developed so far and are used extensively. These apparatuses include dot impact type, thermal type and ink jet type printing apparatuses. In particular, ink jet printers of higher resolution and higher speeds than ever before continue to be developed; they are expected to find their way into an ever-growing range of applications.

In general, the serial recording apparatus has a recording head mounted on a carriage, the recording head printing a single column of data perpendicular to the scanning direction of the carriage. With the carriage making a scanning motion, a predetermined width of a band-shaped area is printed. After each scan of the carriage, a transport roller assembly transports a recording medium by a predetermined amount. The operations are repeated to complete printing on each sheet of recording paper.

FIG. 18 is a schematic plan view of a recorder included in a typical serial recording apparatus. In FIG. 18, reference numeral 101 is a recording head; 102 is a carriage; and 103 is a recording medium. The recording head 101 prints vertically from top to bottom, the carriage 102 scans crosswise, and the recording medium 103 is fed from bottom to top. The direction of printing by a nozzle array of the recording head 101 (i.e., vertical direction) will be called a vector direction hereunder.

The above serial recording apparatus, if constructed illustratively as an ink jet printer, is best suited for printing not only characters but also images because of its high resolution capability. For that reason, more and more ink jet printers are adopted in the printing and recording assemblies of copiers, facsimile machines and other related recording apparatuses.

FIG. 19 is a schematic plan view of a reader included in a typical image reading apparatus. In FIG. 19, reference numeral 111 is a scanner and 112 is an original. As illustrated in FIG. 19, the image reader in copiers or facsimile machines uses as its scanner 111 a line sensor as wide as the original 112 to be read. With the original 112 scanned crosswise by the line sensor one line at a time, the original 112 or the scanner 111 is fed vertically. This allows image data to be read from the original 112. The reading direction of the scanner 111 (i.e., crosswise direction) will be called a raster direction hereunder.

Suppose that the image data obtained in the raster direction by the above-mentioned typical image reading apparatus are to be printed by the typical recording apparatus above which prints in the vector direction. In that case, the difference between the direction in which the image data were read and the direction in which they are to be printed requires a special arrangement to be provided. That is, the image data to be printed upon a single carriage scan in the raster direction are initially stored temporarily, and the stored data are read in the vector direction in such a manner that they will comply with the direction of the nozzle array. In other words, the image data in the raster direction need to be converted in format to those in the vector direction.

Prior art ink jet printers use a page memory to accomplish the format conversion. Image data in the raster direction are placed temporarily in the page memory and are read therefrom for the conversion by software. The conversion process takes time and lowers the processing speed of the entire system. One solution to this problem is disclosed in Japanese Patent Laid-Open No. SHO/58-195357, SHO/58-195358 and SHO/58-195359. The disclosed techniques involve a bit pattern storage device with a capacity of N×L×P (bits), where N stands for the number of nozzles, L for the print width and P for the number of nozzles per millimeter. Data are read into the storage device sequentially, in units of words in the raster direction. From the storage device, the data are read in the vector direction by the number of words corresponding to the nozzle count at a time. The read data are held in registers from which appropriate bits are selected to form single-column print data in the vector direction.

The storage device proposed in connection with the above prior art techniques allows one word (e.g., 16 bits) to be accessed per address. Generally, it is convenient for computer-based processing to utilize a storage device that may be accessed in units of words. According to the above prior art, reading print data word by word from the storage device requires setting up as many registers as the number of nozzles involved. If 128 nozzles exist and the internal data length is 16 bits, there will be needed 128 registers of 16 bits long each. This entails bloated print data reading control circuits leading to an enlarged apparatus and higher manufacturing costs.

In addition to image data, text data are also fed to the recording apparatus. Characters included in the text data are converted to the font data contained in a font storage device. On many printing apparatuses, the font data are sent unmodified to the recording head for recording, and normally there is little problem involved in this respect. Sometimes, it may be desired to print data on a sheet wider than the standard B4 size for which the recording apparatus is designed. In such a case, the print image is rotated 90 degrees for printing onto the B4 recording medium that is transported vertically. This, too, involves format conversion regarding the font data.

A set of techniques for rotating print images by 90 degrees for printing is disclosed illustratively in Japanese Patent Laid-Open No. SHO/58-195365. The disclosed techniques involve furnishing a page memory in which the print data fed in the raster direction are written in units of words in the vector direction. From the page memory, the print data are read sequentially by the number of words corresponding to the nozzle count at a time, the read data being subjected to format conversion. In that case, if the data are to be printed in the normal direction, the data need to be converted from the raster-direction, word-based format to vector-direction, word-based format before being stored into the page memory. Otherwise the data cannot be written to the page memory. That conversion process also takes time. If font data are to be developed within the page memory, additional steps are needed to make the word boundaries of the font data and page memory coincide with one another. Such additional processing overhead further reduces the speed of processing.

SUMMARY OF THE INVENTION

It is therefore an object of the present invention to overcome the above and other deficiencies and disadvantages of the prior art and to provide a recording apparatus of a simple construction capable of performing conversion from raster-direction format to vector-direction format or vice versa.

In carrying out the invention and according to one aspect thereof, there is provided a recording apparatus having a head mounted on a carriage moving relatively to a recording medium, the head printing one column substantially perpendicular to the direction in which the carriage moves so as to print a single line, the recording apparatus comprising: a storage device for storing print data in units of bits and for allowing any of the print data to be accessed in units of bits by an X address and a Y address; an X address counter for designating the X address in the storage device; a Y address counter for designating the Y address in the storage device; a mode setting register for storing write mode data; a memory read/write timing controller for generating a plurality of timing signals for writing and reading to and from the storage device; a bus timing controller for outputting print data in units of bits in accordance with the content of the mode setting register upon receipt of print data in units of words; and a selector for supplying any one of the X address counter and the Y address counter with the timing signals in accordance with the content of the mode setting register, the selector further sending a carry signal from the address counter having received the timing signals to the address counter not receiving the timing signals.

According to another aspect of the invention, there is provided a recording apparatus having a head mounted on a carriage moving relatively to a recording medium, the head printing one column substantially perpendicular to the direction in which the carriage moves so as to print a single line, the recording apparatus comprising: a storage device for storing print data in units of bits and for allowing any of the print data to be accessed in units of bits by an X address and a Y address; an X address counter for designating the X address in the storage device; a Y address counter for designating the Y address in the storage device; a mode setting register for storing write mode data; a memory read/write timing controller for generating a plurality of timing signals for writing and reading to and from the storage device; font storage means for storing font images; control means for receiving text data from outside the recording apparatus, for changing the printing order of the text data as needed according to a current print direction, for causing the font storage means to output a font image based on the text data onto a bus, for setting write mode data in the mode setting register, and for controlling relevant parts of the recording apparatus accordingly; a bus timing controller for outputting print data in units of bits in accordance with the content of the mode setting register upon receipt of the font image from said bus; and a selector for supplying any one of the X address counter and the Y address counter with the timing signals in accordance with the content of the mode setting register, the selector further sending a carry signal from the address counter having received the timing signals to the address counter not receiving the timing signals.

In operation, the X address counter is illustratively incremented or decremented according to the content of the mode setting register every time one bit of data is transferred to the storage device. When the data of up to a predetermined address are stored in the storage device, the selector causes the X address counter to output a carry signal to increment or decrement the Y address counter whereby a storage area having the next Y address is reached. Then subsequent data continue to be stored in the X direction. Alternatively, the Y address counter is incremented or decremented every time one bit of data is transferred to the storage device. When the data of up to a predetermined address are stored in the storage device, the selector causes the Y address counter to output a carry signal to increment or decrement the X address counter. Subsequent data then continue to be stored in the Y direction. Because print data are written to and read from the storage device in units of bits in the X or Y direction depending on the content of the mode setting register, it is possible to output print data in the direction complying with the printing direction of the print head whether the print data output in units of bits from the bus timing controller are in the raster direction or in the vector direction. Since the storage device incorporated is accessible in units of bits, the output print data are fed to the recording head without the intervention of a circuit for conversion from word format to bit format. This contributes to simplifying the circuit construction of the print data reader.

Furthermore, whether printing is to be carried out normally or by having text data rotated by 90 degrees, the font storage means and the control means combine to subject font images to format conversion and write the converted data to the storage device. Since the storage device is accessible in units of bits, there is no need to provide measures for making the word boundaries of the data and storage device coincide with one another.

These and other objects, features and advantages of the invention will become more apparent upon a reading of the following description and appended drawings.

BRIEF DESCRIPTION OF THE DRAWINGS

FIG. 9 is a view depicting how image data in the vector direction are written to the image RAM;

FIG. 10 is a view illustrating how image data in the raster direction are written to the image RAM;

FIGS. 15(A) and 15(B) are a set of views showing a font structure used by the embodiment;

DESCRIPTION OF THE PREFERRED EMBODIMENT

Figure 1:
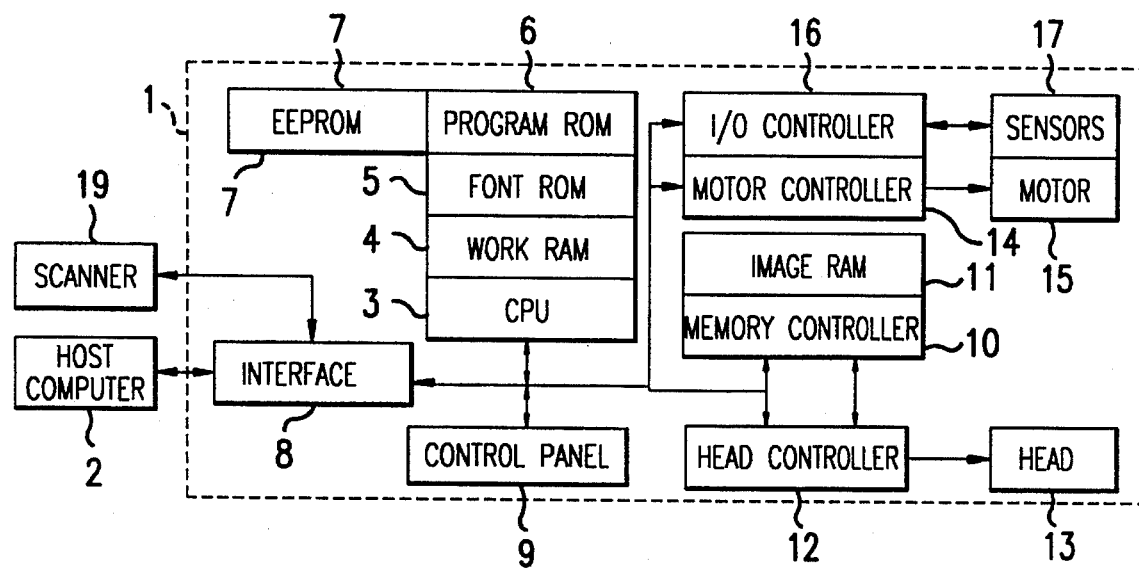
FIG. 1 is a system block diagram of an ink jet printer embodying the present invention.

FIG. 1 is a system block diagram of an ink jet printer practiced as a preferred embodiment of the invention. In FIG. 1, reference numeral 1 is an ink jet printer, 2 is a host computer, 3 is a CPU, 4 is a work RAM, 5 is a font ROM, 6 is a program ROM, 7 is an EEPROM, 8 is an interface, 9 is a control panel, 10 is a memory controller, 11 is an image RAM, 12 is a head controller, 13 is a recording head, 14 is a motor controller, 15 is a motor, 16 is an I/O controller, 17 is a set of sensors, 18 is a common bus, and 19 is a scanner.

The ink jet printer 1 is connected to the host computer 2 and scanner 19, and exchanges data therewith. The CPU 3, connected to the work RAM 4, font ROM 5, program ROM 6 and EEPROM 7, runs according to the programs held in the program ROM 6 while referencing the settings in the EEPROM 7 (such as compensation data for higher image quality). Also connected to the common bus 18, the CPU 3 controls various parts in the ink jet printer 1 by way thereof. The work RAM 4 is used as a work area of the CPU 3; it is also used for storing various kinds of intra-system information. The font ROM 5 accommodates image data about characters to be printed. The program ROM 6 stores programs for ordering the CPU 3 how to operate. The EEPROM 7 is a nonvolatile memory whose contents are held intact when power is removed. This memory is used to store various settings such as compensation data for higher image quality and a system operation mode. The settings may also be furnished through the control panel 9.

The interface 8 is connected to the common bus 18, host computer 2 and scanner 19. The interface 9 exchanges data directly with the host computer 2 or scanner 19. The control panel 9, connected to the common bus 18, receives various inputs from the user and displays various states and messages for the user.

The memory controller 10 is connected to the image RAM 11, common bus 18 and head controller 12. The memory controller 10 controls the image RAM 11 which accommodates in image format the data to be recorded.

The head controller 12 is connected to the recording head 13, common bus 18 and memory controller 10. The head controller 12 controls the timings for the recording head 13 in jetting out ink through its nozzles. The recording head 13 comprises a plurality of heads each having N nozzles. There may be one recording head 13 for monochromatic printing, or there may be four recording heads 13 (black K, cyan C, magenta M and yellow Y) for color printing.

The motor controller 14, connected to the motor 15 and common bus 18, controls the motor 15. The motor 15 provides a relative movement between the carriage carrying the recording head 13 and the recording medium (e.g., recording paper). The I/O controller 16 is connected to the various sensors 17 and common bus 18. What the I/O controller 16 does is to control the sensors 17 and acquire sense data therefrom. The sensors 17 include illustratively a paper end detecting sensor, a sheet width detecting sensor and an ink amount detecting sensor.

The common bus 18 interconnects the CPU 3, interface 8, control panel 9, memory controller 10, head controller 12, motor controller 14 and I/O controller 16. The common bus 18 permits transmission of various data and control signals between the parts connected thereto.

Although the constitution of the embodiment is divided as described by function, other arrangements are also possible. For example, the image RAM 11 and the work RAM 4 may be contained in the same RAM.

How the system of FIG. 1 works will now be described. The CPU 3 operates according to the programs held in the program ROM 6 while referencing the settings contained in the EEPROM 7. In so doing, the CPU 3 utilizes the work RAM 4 as needed. The settings held in the EEPROM 7 are established through the control panel 9. Receiving data from the sensors 17 via the I/O controller 16, the CPU 3 performs a number of operations. Such operations include checking to see if printing is currently possible, aligning the recording position by ordering the motor controller 14 to move the carriage or transport the recording paper appropriately, and others.

The host computer 2 and scanner 19 supply the interface 8 with the data to be recorded, e.g., image data and text data. Upon receipt of the data, the interface 8 forwards them to the CPU 3 or to the memory controller 10. When, say, text data are sent from the host computer 2, the CPU 3 uses the font ROM 5 to convert the text data to image data corresponding to character codes. The image data are sent to the memory controller 10. The image data transmitted from the host computer 2 or from the scanner 19 may be in the raster direction or in the vector direction. For example, the scanner 19 may illustratively have the structure of FIG. 19. In that case, the scanner 19 transmits image data in the raster direction. The memory controller 10 stores in the image RAM 11 the image data having been sent over the common bus 18. At this point, the direction in which to write data to the image RAM 11 is controlled and format conversion carried out as needed depending on the attributes of the transmitted image data (direction of data being in raster direction or vector direction, direction of data rotation, etc.).

With the image data stored in the image RAM 11, the CPU 3 requests the motor controller 14 to move the carriage for scanning. The carriage carrying the recording head 13 has an encoder for generating a print timing signal. As the carriage moves, the encoder generates the timing signal corresponding to the scanning speed of the carriage and sends the signal to the CPU 3 as well as to the head controller 12. In turn, the CPU 3 determines the print starting position based on the timing signal received and feeds the head controller 12 with a print enable gate signal accordingly. Given the print enable gate signal and the print timing signal, the head controller 12 requests the memory controller 10 to read out print data. Besides sending the read-out print data to the recording head 13, the head controller 12 outputs a head driving signal to the recording head 13. The operations above are performed continuously. When printing by a single scan is completed, the memory controller 10 issues an interrupt signal to the CPU 3. On receiving the interrupt signal, the CPU 3 requests the motor controller 14 to transport the recording medium by a predetermined print width and to execute another scan of the carriage. In this manner, single-scan printing is carried out a number of times until print action is terminated in the direction in which the recording medium is transported.

When print action on one recording medium is completed, the CPU 3 requests the motor controller 14 to eject the medium out of the recording apparatus. At the same time, the CPU 3 moves the carriage up to a cap mechanism that caps the nozzles of the recording head 13, causes the cap mechanism to cap the nozzles to keep ink from getting dry thereon, and waits for another print action to commence. The above series of operations completes the print action of the printer onto one recording medium.

Figure 2:
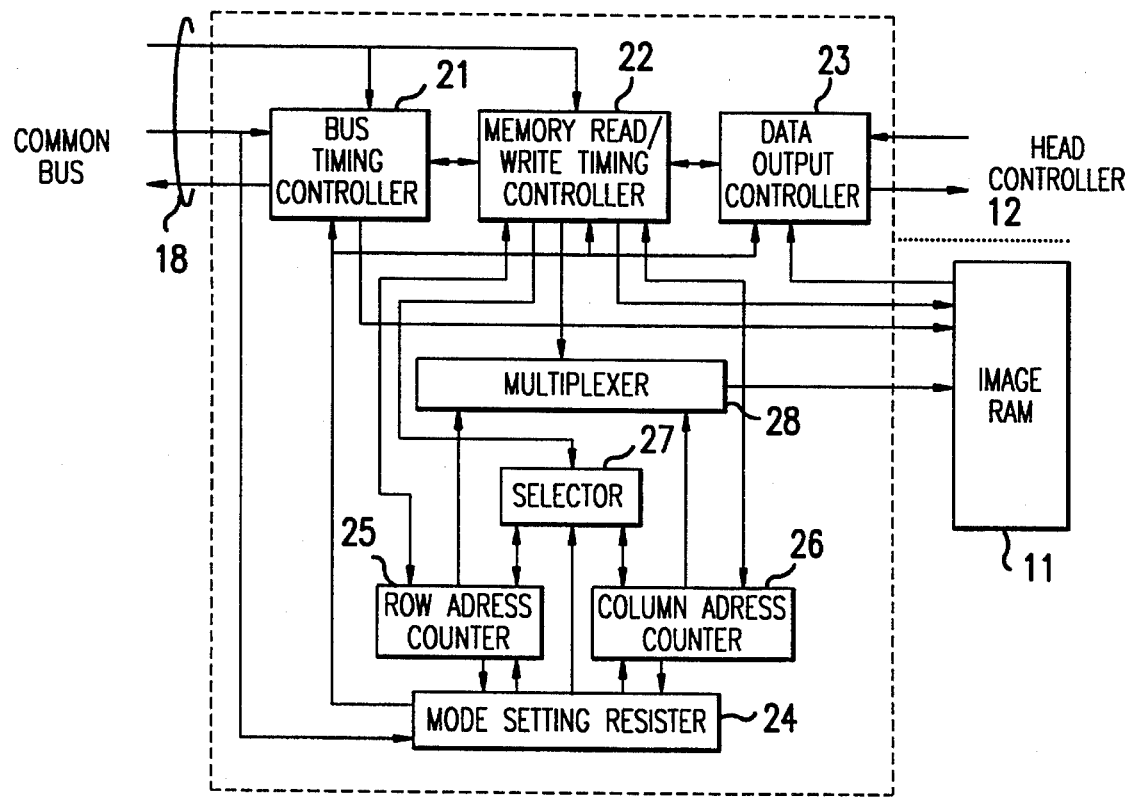
FIG. 2 is a block diagram of a memory controller, an image/AM and their associated parts in the embodiment.
Figure 3:
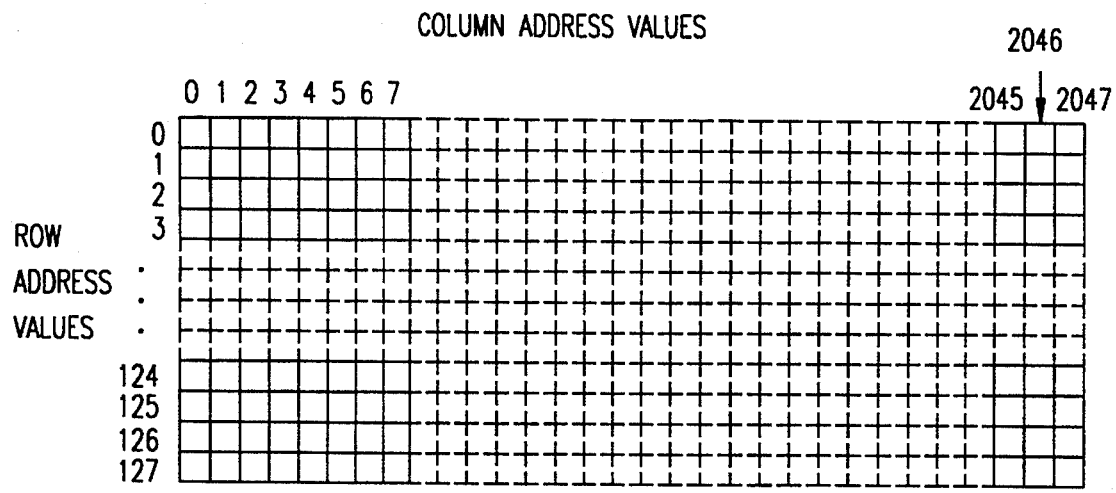
FIG. 3 is a view describing the image RAM.
Figure 4:
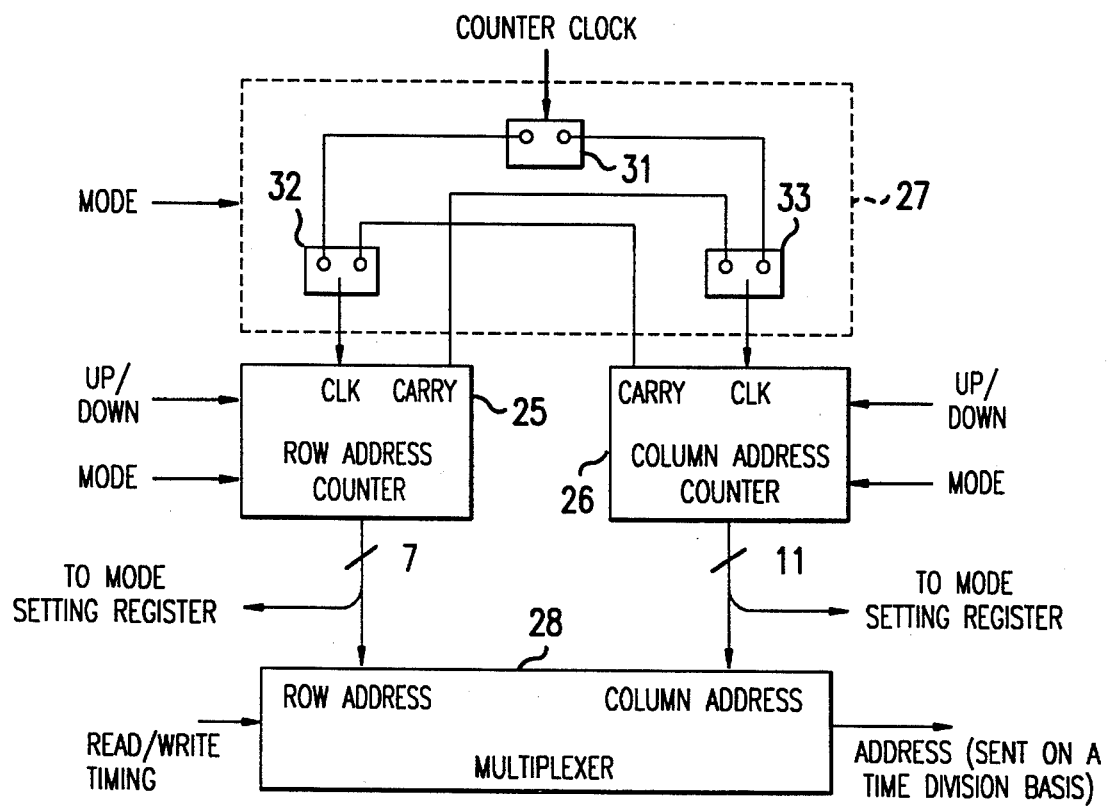
FIG. 4 is a block diagram of a selector, a row address counter, a column address counter and their associated parts in the embodiment.

FIG. 2 is a block diagram of the memory controller 10, the image RAM 11 and their associated parts in the embodiment. Between FIG. 2 and FIG. 1, like reference characters designate like or corresponding parts. In FIG. 2, reference numeral 21 is a bus timing controller, 22 is a memory read/write timing controller, 23 is a data output controller, 24 is a mode setting register, 25 is a row address counter, 26 is a column address counter, 27 is a selector, and 28 is a multiplexer. FIG. 3 depicts the construction of the image RAM 11, and FIG. 4 is a block diagram of the selector 27, row address counter 25, column address counter 26 and their associated parts in the embodiment. In FIG. 4, reference numeral 31 is a first selector, 32 is a second selector and 33 is a third selector.

As shown in FIG. 3, the image RAM 11 has a two-dimensional arrangement of 2,048 storage elements (1 bit of data length each) in the row direction by 128 storage elements in the column direction. The image RAM 11 receives an address from the multiplexer 28, one-bit write data from the bus timing controller 21, and various control signals from the memory read/write timing controller 22. In turn, the image RAM 11 outputs one-bit read data to the data output controller 23. Although the invention adopts a DRAM (dynamic RAM) as the image RAM 11, any other appropriate memory device may be used instead. The address directed at the image RAM 11 comes from the multiplexer 28, consisting of a row address and a column address sent on a time division basis. Each of the bits in the image RAM 11 is accessed independently by the combination of the row and column address values. The highest row address is generally set equal to the number of nozzles in the recording head; the highest column address is made to correspond with the number of the dots constituting the maximum printable width covered by the moving carriage. For example, if the recording head 13 has 128 nozzles, the address value in the nozzle array direction, i.e., in the row direction may range from 0 to 127. The number of dots in the row direction is $128=2^7$. That is, a seven-bit counter is needed. Where the maximum printable width is 256 mm and the resolution is 8 dots per millimeter, the number of dots in the column direction is $256 \times 8 = 2,048 = 2^{11}$. Thus an 11-bit counter is needed. Here, the capacity required of the memory incorporated as the image RAM 11 is $2^7 \times 2^{11} = 2^{18} = $ 256 kilobits. That is, a single 256-kilobit DRAM suffices for use as the image RAM 11. Data are written to and read from the image RAM 11 in accordance with a data write signal and a data read signal from among the signals generated by the memory read/write timing controller 22.

The bus timing controller 21 receives word-format image data sent from the CPU 3 or interface 8 via the common bus 18, control signals from the CPU 3, timing signals from the memory read/write timing controller 22, and mode data from the mode setting register 24. In turn, the bus timing controller 21 sends one-bit format image data to the image RAM 11, an image data write request to the memory read/write timing controller 22, and a flag signal to the CPU 3 or interface 8. The bus timing controller 21 serves to interface with the common bus 18 as well as with other hardware, and has a parallel/serial conversion function whereby the word-format image data received are converted to bit-format image data.

The memory read/write timing controller 22 controls the operation timings of the image RAM 11 and memory controller 10. That is, the memory read/write timing controller 22 receives control signals from the CPU 3 via the common bus 18, a write request from the bus timing controller 21, a read request from the data output controller 23, and mode data from the mode setting register 24. In turn, the memory read/write timing controller 22 outputs control signals such as a write and a read signal to the image RAM 11 while monitoring the refresh cycle thereof. The memory read/write timing controller 22 also outputs an address output timing signal to the multiplexer 28, a count timing signal to the address counters via the selector 27, and data write/read timing signals to the bus timing controller 21 and data output controller 23. The memory read/write timing controller 22 further supplies the row address counter 25 and column address counter 26 with a signal for designating count-up or count-down as well as with a signal for specifying the bit width used for the counting. The memory read/write controller 22 internally generates control signals by which to refresh the image RAM 11 using interruptions furnished at constant intervals as per a built-in refresh timer.

The data output controller 23 controls functions of interface with the head controller 12. Connected to the memory read/write timing controller 22 and image RAM 11, the data output controller 23 requests the memory read/write timing controller 22 to generate a data read signal. In synchronism with the data read signal sent from the memory read/write timing controller 22, the data output controller 23 reads data from the image RAM 11 and temporarily stores the data in an internal register arrangement. The data output controller 23 is also connected to the head controller 12 that sends an image data request and a read clock signal to the former. Given the image data request and read clock signal from the head controller 12, the data output controller 23 transfers the data from an internal register 1 to a register 2 for data output. The two registers operate in parallel during printing.

The mode setting register 24 is connected to the bus timing controller 21, memory read/write timing controller 22, data output controller 23, row address counter 25, column address counter 26 and selector 27. The mode setting register 24 accommodates mode data received via the common bus 18, the mode data determining the operation modes of the parts connected thereto. After being accommodated in the above manner, the mode data representing the operation modes are output to the parts connected to the mode setting register 24. The mode setting register 24 includes a comparator that compares its value set by the CPU 3 or others with the output data from the row address counter 25 and column address counter 26. In case of a match between the values compared, the comparator notifies the bus timing controller 21 of that match.

The row address counter 25 and column address counter 26 indicate row and column address values for the image RAM 11, respectively. Each of the two counters is connected to the memory read/write timing controller 22, selector 27, mode setting register 24 and multiplexer 28. The operation of the counters 25 and 26 is determined by a count-up or -down designation signal from the memory read/write timing controller 22, by a bit count data signal designating the number of bits of the counter in use, and by a signal from the mode setting register 24. With their operation thus determined, the row and column address counters 25 and 26 count the timing signals sent through the selector 27. The counted data are sent to the multiplexer 28 which in turn feeds the image RAM 11 with the appropriate address on a time division basis. The counted data are also supplied to the mode setting register 24 for comparison with the value held therein. The address may also be preset. The selector 27 is connected to the memory read/write timing controller 22, mode setting register 24, row address counter 25 and column address counter 26. According to the operation mode data from the mode setting register 24, the selector 27 forwards the timing signals from the memory read/write timing controller 22 either to the row address counter 25 or to the column address counter 26. At the same time, the selector 27 transfers the carry signal output by the address counter having received the timing signals to the other address counter. The multiplexer 28 is connected to the row address counter 25, column address counter 26 and memory read/write timing controller 22. In synchronism with an address transfer timing signal from the memory read/write timing controller 22, the multiplexer 28 selects the row address from the row address counter 25 or the column address from the column address counter 26 for time-division address transmission to the image RAM 11. If the image RAM 11 is sequentially accessible in the row or column direction, the multiplexer 28 may select and output either a row address or a column address according to the mode set in the mode setting register 24.

FIG. 4 is a block diagram showing the row address counter 25, column address counter 26, selector 27 and multiplexer 28 in the embodiment. The selector 27 comprises a first selector 31, a second selector 32 and a third selector 33. The first selector 31 receives from the memory read/write timing controller 22 a timing signal corresponding to a memory read or write operation. In turn, the first selector 31 selects either the row address counter 25 or the column address counter 26 and feeds the timing signal to that selected counter. The second and the third counters 32 and 33 supply respectively the row and the column address counters 25 and 26 with a count signal selected from one of the two signals: the timing signal sent from the first selector 31, or the carry signal output by the other address counter. For example, if the first selector 31 selects the row address counter 26, then the third selector 33 selects the timing signal from the first selector 31 and the second selector 32 selects the carry signal from the column address counter 26. This allows the row address counter 25 to count the carry signal from the column address counter 26. The selecting operation of the first through the third selectors is carried out according to an operation mode signal from the mode setting register 24. The carry signal is output when an address counter is incremented to exceed its maximum value or is decremented to drop below 0. For example, where the timing signal is fed to the row address counter 25, the counter 25 is incremented from 0 to its maximum value and, given the next timing signal, generates a carry signal for output to the column address counter 26. This causes the column address counter 26 to start its counting, while the row address counter 25 is reset to 0. Thus data may be written to or read from the next column.

Figure 6:
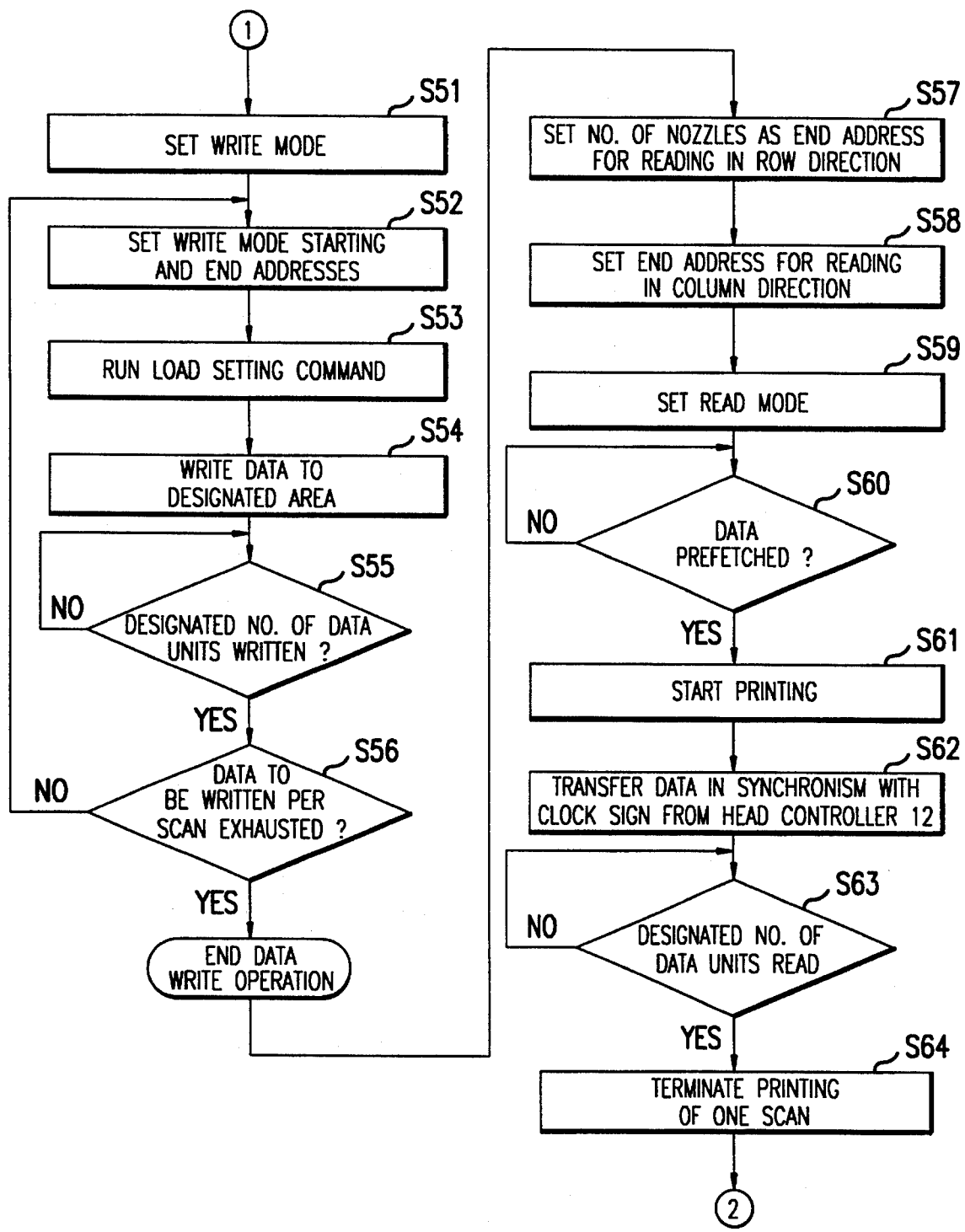
Figure 7:
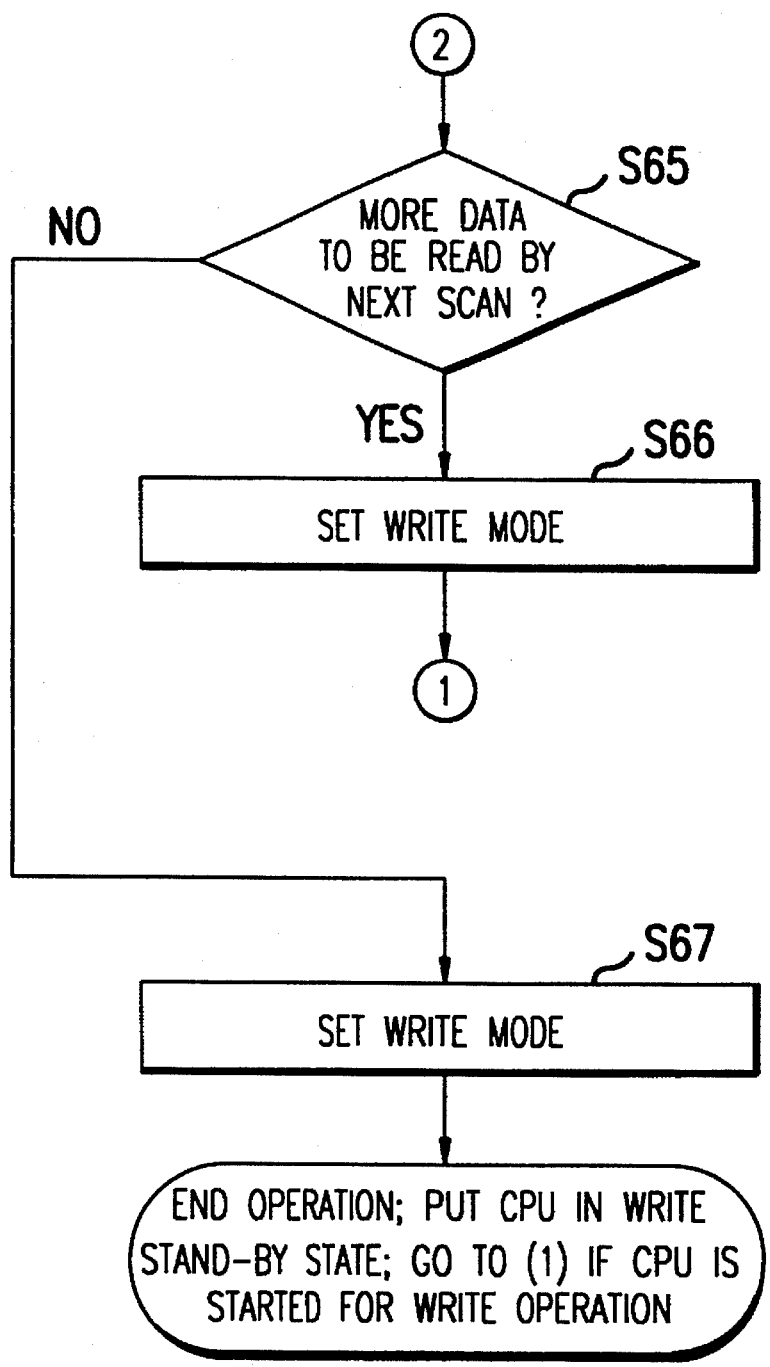

How the parts in the memory controller 10 of the embodiment operate in general will now be described with reference to FIGS. 5 through 7. The figures are flowcharts outlining how the memory controller 10 works illustratively.

Figure 5:
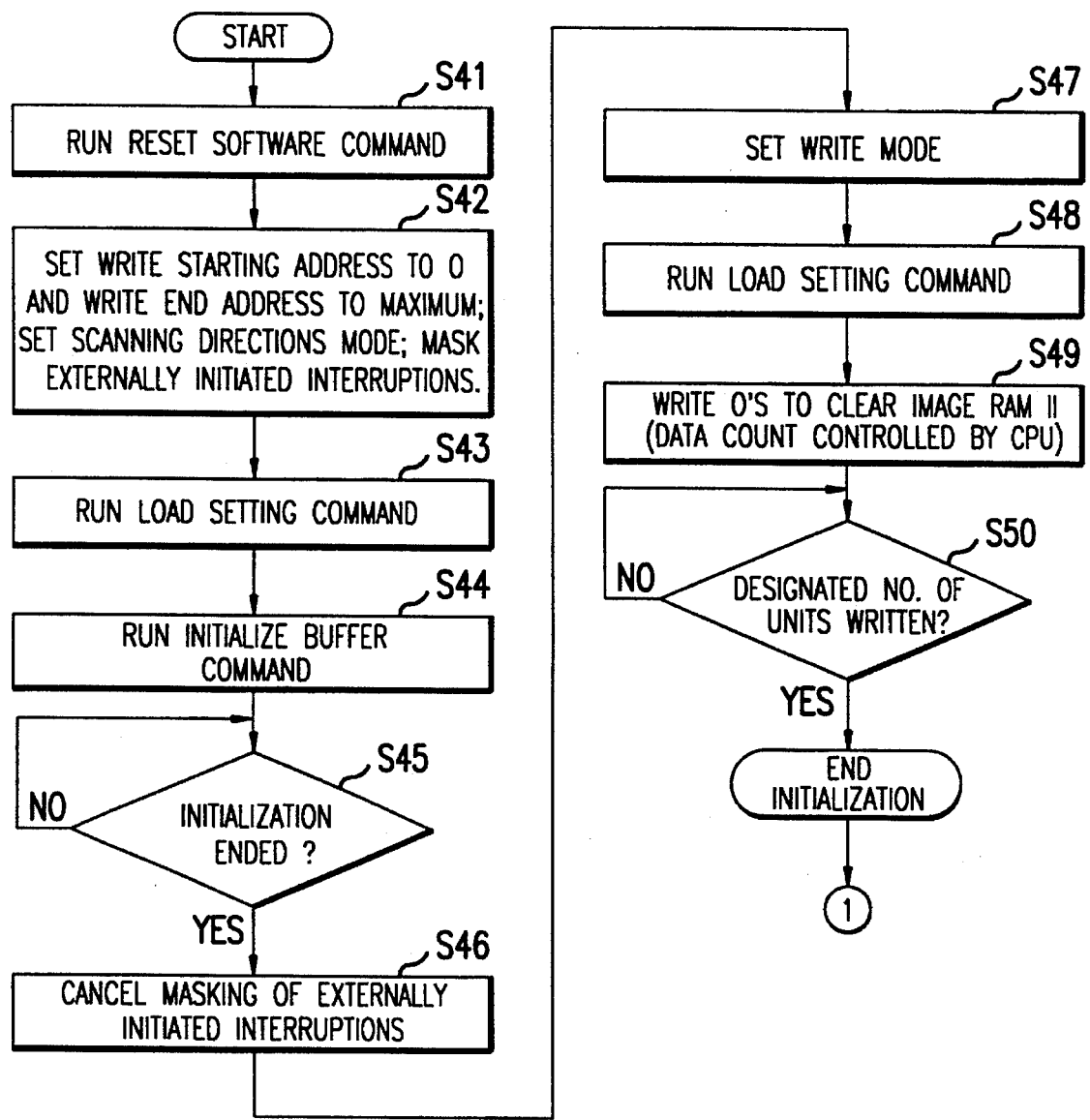
FIGS. 5 through 7 are flowcharts showing how the memory controller typically works.

Steps 41 through 50 in FIG. 5 represent initialization. In step 41, a Reset Software command is executed to start initialization. Step 42 sets the write start address to row 0, column 0; sets the write end address to maximum available values; establishes an appropriate write mode; and masks externally initiated interruptions. In step 43, necessary settings are loaded into the mode setting register 24 and other locations. In step 44, an Initialize Buffer command is executed to initialize the image RAM 11 automatically. In step 45, a check is made to see if initialization is complete. In step 46, the masking of external interruptions is canceled. In step 47, write mode is set. In step 48, the settings are loaded. In step 49, the image RAM 11 is cleared by writing zeros thereto. In step 50, the end of writing to the image RAM 11 is verified. This completes the steps of initialization.

Initialization is followed by a write operation. In step 51, write mode is set. In step 52, write starting and write end addresses are set. In step 53, the settings are loaded into the mode setting register 24 and other appropriate locations.

According to the number of nozzles on the recording head furnished and to the printing range available, the CPU 3 determines the number of bits for use by the row and column address counters 25 and 26 for counting. The bit count is set in the mode setting register 24. For example, if the maximum recording width available is 256 mm and the maximum printable width is 128 mm, the column address counter 26 may be set so that it counts without using its most significant bit. Also set are an increment or decrement mode and a raster-direction or vector-direction count option for the row and column address registers 25 and 26.

In step 54, actual data are written to a designated storage area. In step 55, a check is made to see if the writing is terminated. Image data sent in from the host computer 2 or similar sources reach the interface 8. From the interface 8, the CPU 3 receives the image data and transfers them unmodified to the memory controller 10. The data may alternatively be transferred through the work RAM 4 for image processing. Before data transfer, the CPU 3 checks to see if the transfer is available. When the availability of data transfer is confirmed, the CPU 3 writes the image data. Where the image data are sent over the common bus 18, the bus timing controller 21 stores them temporarily in its internal data register. The image data thus sent in are illustratively 16-bit word data. With the image data received, a write request is transmitted to the memory read/write timing controller 22.

The memory read/write timing controller 22 arbitrates between writing and the refresh cycles of the image RAM 11. Upon completion of a refresh cycle of the image RAM 11, the memory read/write timing controller 22 outputs a read clock signal to the bus timing controller 21. The bus timing controller 21 converts the temporarily stored image data to serial data in units of bits in synchronism with the read clock signal furnished. In so doing, the bus timing controller 21 transfers the image data to the image RAM 11. At the same time, the memory read/write timing controller 22 outputs an address transfer timing signal to the multiplexer 28. In synchronism with this timing signal, the multiplexer 28 outputs the row and column address values from the row and column address counters 25 and 26 to the image RAM 11 on a time division basis. Furthermore, the memory read/write timing controller 22 outputs various strobe signals such as a write signal to the image RAM 11 so that one-bit image data will be written to the image RAM 11.

The memory read/write timing controller 22 outputs a count clock signal every time a one-bit data unit is written to the image RAM 11. The count clock signal is input through the selector 27 to the address counter selected thereby. The selected address counter is incremented or decremented by the count clock signal to update the memory address.

After memory address update, a check is made to see if the value on the address counter has reached the write end address. The above write steps are repeated until the write end address is reached. With all image data written, the comparator in the mode setting register 24 detects a match between the address register content and the write end address that was set in the mode setting register 24 before the write operation was started. Then the bus timing controller 21 is notified of the end of the write operation. In turn, the bus timing controller 21 supplies the CPU 3 with status indicating the end of writing the designated number of data units. The status allows the CPU 3 to recognize that all print data have been written. This prompts the CPU 3 to terminate the write operation and switches to a read operation.

Step 57 is first reached for the read operation. In step 57, the number of the nozzles furnished is set as the end address in the row direction. In step 58, the end address in the column direction is set. In step 59, read mode is set, the settings are loaded into the mode setting register 24 and other appropriate locations, and the read operation is started.

When print data start to be read, the data output controller 23 requests the memory read/write timing controller 22 to read image data, and outputs a read clock signal thereto. In step 60, as in the write operation, the memory read/write timing controller 22 arbitrates between reading and the refresh cycles of the image RAM 11. The image data are read from the image RAM 11 to the data output controller 23 according to the print data read request and in synchronism with the read clock signal. As in the write operation, the memory read/write timing controller 22 issues various strobe signals to the image RAM 11 for reading data therefrom.

The data thus read out are held temporarily in the register of the data output controller 23. This completes the data prefetch operation in step 60. In step 61, the carriage starts to be moved. In step 62, the print data start to be transferred. The prefetched data held temporarily in the register of the data output controller 23 are output in synchronism with an image data read clock signal from the head controller 12. Where parallel data transfer to the head controller 12 is desired, the register in the data output controller 23 may be used for serial/parallel conversion purposes. Alternatively, a separate register may be provided to accommodate the read data after serial/parallel conversion, the data being transferred from the register to the head controller 12. In the latter setup, data may be read from the image RAM 11 with serial/parallel conversion carried out in parallel during the data transfer involving the separate register.

Appropriate command settings may be provided to have the memory read/write timing controller 22 read data from the image RAM 11 so as to either delete the read-out data or retain the data. Where the read-out data are to be deleted, the process of clearing the data from the image RAM 11 by the CPU 3 may be omitted. The arrangement whereby the read-out data are retained is applied where the image needs to be formed by a plurality of scans over the same print area for high-quality printing or for printing on an OHP sheet. It is also possible to set up a function allowing printing by a plurality of scans to proceed until the last scan, whereupon the read-out data are deleted.

In step 63, a check is made to see if all target data have been read. In step 64, the printing by a single scan comes to an end when the read-out data have been printed. After the read operation, the bus timing controller 21 supplies the CPU 3 with status indicating the end of reading the designated number of data units. The status allows the CPU 3 to recognize that all print data have been read. In step 65, a check is made to see if there exist other data to be written. If there do exist data to be written, step 66 is reached in which write mode is set. Step 66 is followed by step 51 or 52 for the next write operation. If there are no other data to be written, step 67 is reached. In step 67, write mode is set, the operation is terminated, and the CPU 3 enters stand-by state.

More specific operations of the memory controller 10 and image RAM 11 will now be described in connection with various kinds of data to be written. First suppose that image data in the vector direction come from the host computer 2 or from like sources. In this case, the image data being sent in range, when stored in the image RAM 11, from row 0, column 0 to the maximum row and column.

That the print data directed to the memory controller 10 are in the vector direction is detected by suitable means such as the CPU 3. The detected data direction is preset in the mode setting register 24. The operation modes of the parts involved are then established according to the data that is set in the mode setting register 24. When the data are in the vector direction, both the row address counter 25 and the column address counter 26 operate in a mode wherein each counter is incremented from 0. In the selector 27, the first selector 31 switches to the row address counter 25 and the second selector 32 to the first selector 31. This allows the row address counter 25 to receive timing signals from the memory read/write timing controller 22. The third selector 33 is set to receive the carry signal from the row address counter 25, and the column address counter 26 is set to count the carry signal from the row address counter 25.

Figure 8:
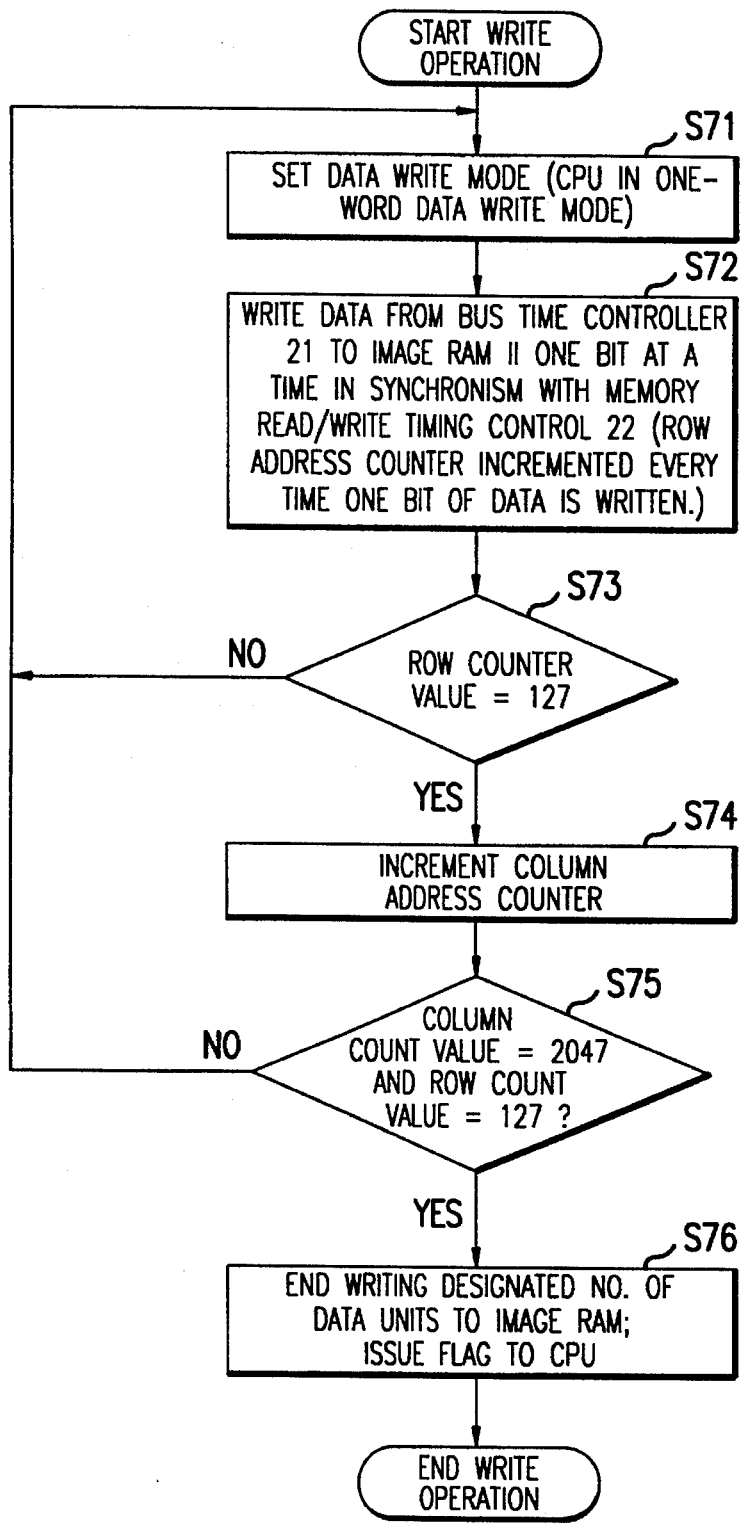
FIG. 8 is a flowchart of steps in which to write image data in the vector direction.

With the mode setting steps completed, actual image data start to be written. FIG. 8 is a flowchart of steps in which to write image data in the vector direction. In step 71 of FIG. 8, the mode setting is followed by the transfer of image data over the common bus 18 from the CPU 3 or work RAM 4. The image data transferred are held temporarily in the data register of the bus timing controller 21. With the image data received, a write request is sent to the memory read/write timing controller 22.

In step 72, the image data in the register of the bus timing controller 21 are transferred therefrom to the image RAM 11 after conversion to serial data in units of bits in synchronism with a read clock signal from the memory read/write timing controller 22. At the time of writing one-bit image data to the image RAM 11, both the row address counter 25 and the column address counter 26 are at zero so that the image data will be written to row 0, column 0 in the image RAM 11. Any location in the image RAM 11 will be shown hereunder in the form of (row address, column address).

The memory read/write timing controller 22 outputs a count clock signal every time a one-bit data unit is written to the image RAM 11. The count clock signal is sent through the selector 27 to the address counter selected thereby (i.e., row address counter 25 in this case). The count clock signal increments the row address counter 25 so as to update the memory address.

After memory address update, step 73 is reached. In step 73, a check is made to see if the value on the row address counter has reached 127. The above write steps are repeated until the value of 127 is reached. That is, the next one-bit data unit is written to the location (1, 0) in the image RAM 11. In this manner, one word made of image data bits D15 through D0 received by the bus timing controller 21 is written one bit at a time to the image RAM 11, i.e., bit D15 to (0, 0), D14 to (1, 0), ..., and D0 to (15, 0).

With one word of image data written to the image RAM 11, the bus timing controller 21 changes status and requests the CPU 3 to forward the next one word of image data. As described, the next one word received by the bus timing controller 21 is written one bit at a time to the image RAM 11. The word data thus written are mapped as follows: D15 written to (16, 0), D14 to (17, 0) , . . . , and D0 to (31, 0). With the eighth word, bit D15 is written to (112, 0), D14 to (113, 0) , . . . , and D0 to (127, 0).

When the last bit of the eighth word is written and the address is updated, the value of the row address counter 25 exceeds the maximum countable value of 127. At that point, step 73 is followed by step 74. In step 74, the row address counter 25 outputs the carry signal that is forwarded via the third selector 33 to the column address counter 26. Upon receipt of the carry signal, the column address counter 26 is incremented by 1. The row address counter 25 is reset to 0. In step 75, a check is made to see if the column address counter 26 has reached 2,047. If the value of 2,047 has yet to be reached, the above write steps are repeated. In that case, the ninth word is also written one bit at a time to the image RAM 11, with bit D15 written to (0, 1), D14 to (1, 1) , . . . , and D0 to (15, 1).

The image data in the vector direction are written to the image RAM 11 in the manner described. When the writing of the 16,384th word is completed, bit D15 is written to (112, 2,047), D14 to (113, 2,047) , . . . , D1 to (126, 2,047), and D0 to (127, 2,047). Thus the designated number of data units have been written.

FIG. 9 is a view depicting how image data in the vector direction are written to the image RAM 11. The numbers in the figure indicate the order in which data units are written. That is, the image data in the vector direction are written to the image RAM 11 in the numbered order shown in FIG. 9.

When all image data have been written and step 75 is reached, a check is made to see if the column address counter 26 and the row address counter 25 have attained 2,047 and 127, respectively. If these values are found to be attained, step 76 is reached. In step 76, the comparator in the mode setting register 24 detects the end of the write operation. A flag in the bus timing controller 21 notifies the CPU 3 of the end of printing. In turn, the CPU 3 sets read mode to the memory read/write timing controller 22 via the mode setting register 24.

Figure 11:
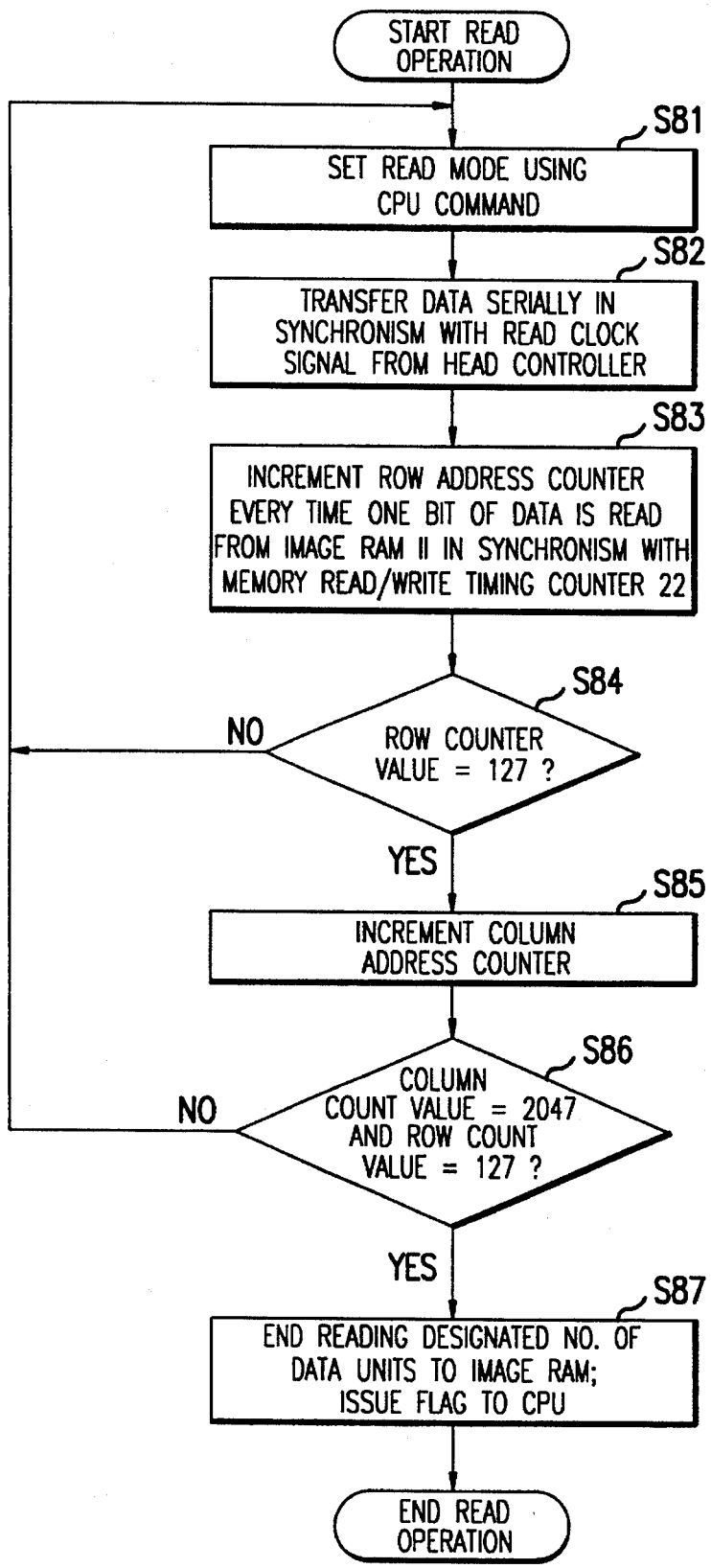
FIG. 11 is a flowchart of steps in which to read print data in the vector direction.

FIG. 11 is a flowchart of steps in which to read print data in the vector direction. Step 81 of FIG. 11 sets in the mode setting register 24 a read mode in which to access print data in the vector direction. The settings in the selector 27 are the same as those for the write operation. With the settings established, step 82 is reached. In step 82, the data output controller 23 requests the memory read/write timing controller 22 to read the image data. In turn, the memory read/write timing controller 22 outputs a read clock signal. In step 83, a one bit data unit is read from the image RAM 11 and sent to the data output controller 23 in synchronism with the read clock signal. The data unit thus read out is held temporarily in the register of the data output controller 23. The data output controller 23 outputs the data in synchronism with an image data read clock signal from the head controller 12.

The read operation and the order in which to read the data are the same as those in effect when image data are written. The memory read/write timing controller 22 outputs a count clock signal every time a one-bit data unit is read from the image RAM 11. The count clock signal is counted by the row address counter 25. In step 84, a check is made to see if the row address counter 25 has reached 127. The one-bit read steps are repeated until the count of 127 is reached. In step 85, the column address counter 26 is incremented by 1. The incrementing is the same as that of the write operation. In step 86, a check is made to see if the row address counter 25 and column address counter 26 have attained 127 and 2,047, respectively. The one-bit read steps are repeated until the column address counter 26 reaches 2,047. With the count of 2,047 attained, step 87 is entered. By this time, the data have been read from locations (0, 0), (1, 0) , . . . , (127, 0), (0, 1), (1, 1) . . . , and (127, 2,047). The order in which the data have been read out is the same as that when image data are written. With the read operation completed in step 87, the bus timing controller 21 supplies the CPU 3 with status indicating the end of reading the designated number of data units. The status allows the CPU 3 to recognize that all print data have been read out.

Figure 19:
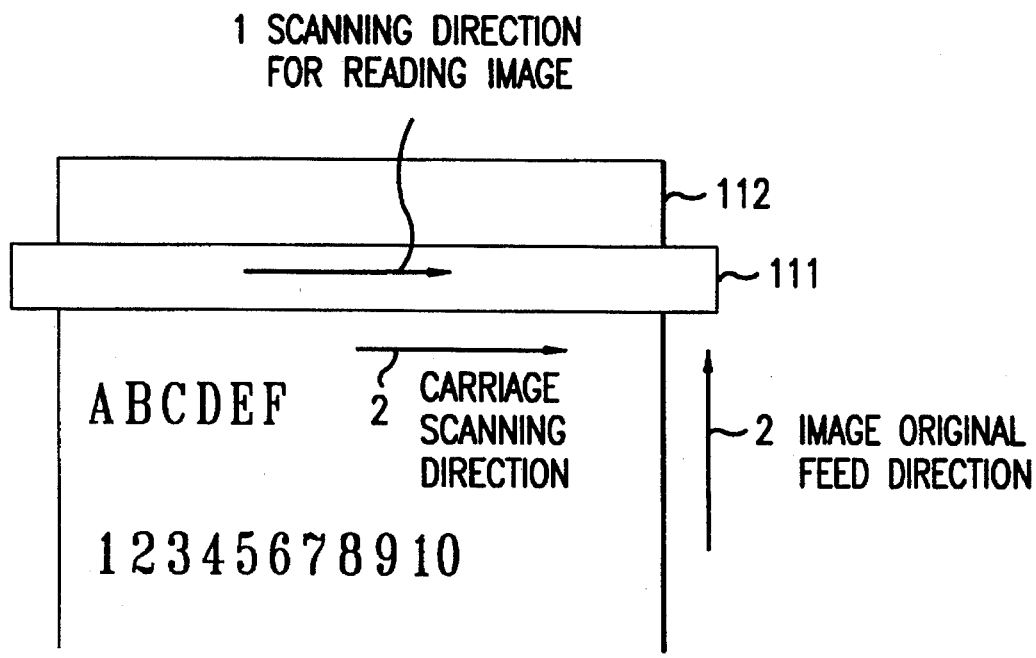
FIG. 19 is a schematic plan view of a reader included in a typical image reading apparatus.

Described below is what takes place when image data in the raster direction are sent in from the host computer 2, from the image scanner of FIG. 19 or from like sources. Initially, the CPU 3 sets in the mode setting register 24 a write mode in which to write the image data in the raster direction. The row address counter 25 and column address counter 26 both operate in a mode in which each counter is incremented from 0.

When the image data sent in are in the raster direction, the settings of the selector 27 differ from those in effect when image data are in the vector direction. That is, in the selector 27, the first selector 31 switches to the column address counter 26, the second selector 32 is set to receive the carry signal from the column address counter 26, the row address counter 25 is set to count the carry signal from the column address counter 26, and the third selector 33 switches to the first selector 31. These settings allow the column address counter 26 to receive timing signals from the memory read/write timing controller 22.

Figure 12:
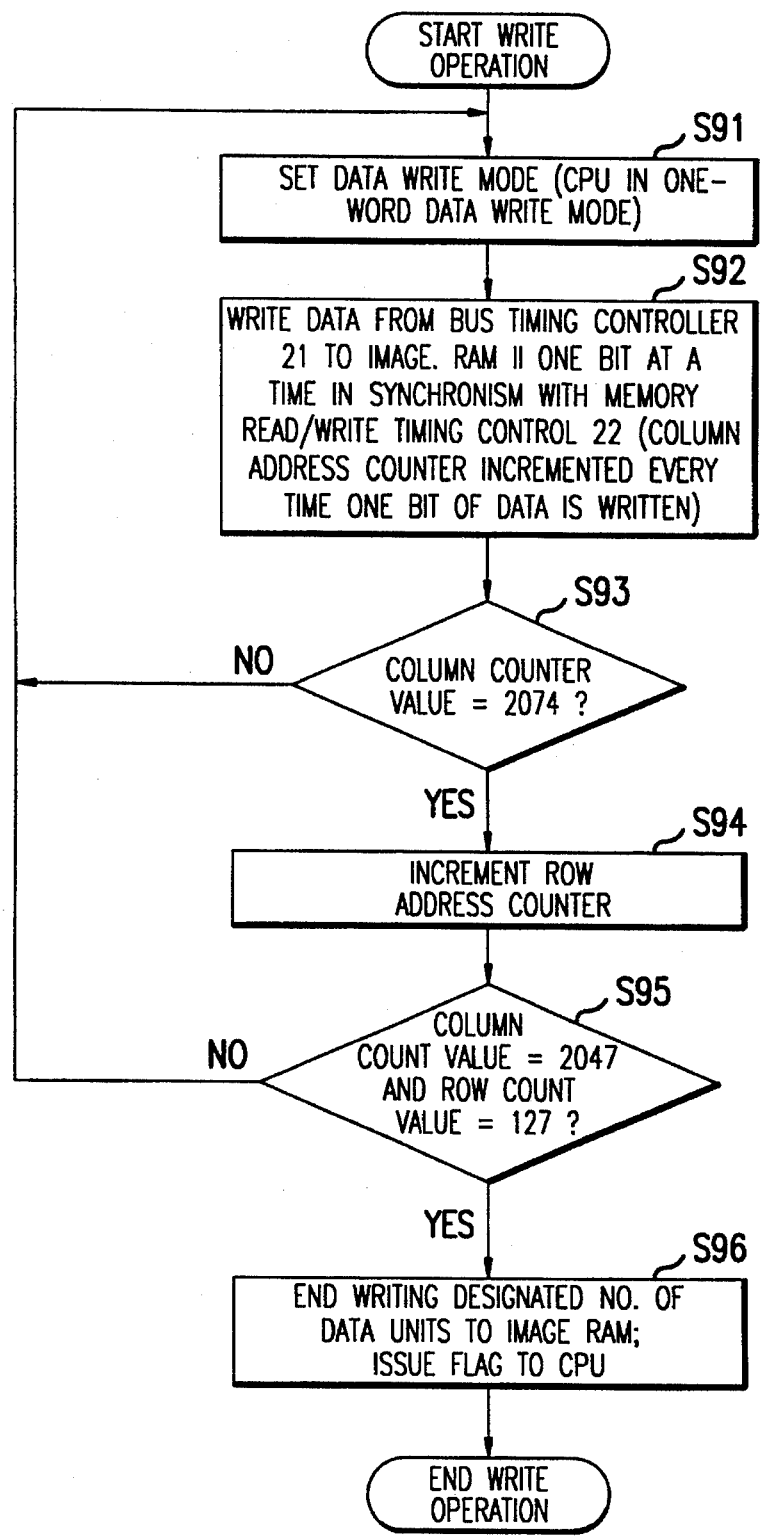
FIG. 12 is a flowchart of steps in which to write image data in the raster direction.

When necessary mode settings are completed, actual image data start to be written. FIG. 12 is a flowchart of steps in which to write the image data in the raster direction. In step 91 of FIG. 12, the mode settings are established; the image data in the raster direction are transferred from the host computer 2, from the image scanner 19 or from like sources; and the data are held temporarily in the data register of the bus timing controller 21. With the image data received, a write request is output to the memory read/write timing controller 22.

In step 92, the image data in the register of the bus timing controller 21 are transferred therefrom to the image RAM 11 after conversion to serial data in units of bits in synchronism with a read clock signal from the memory read/write timing controller 22. Because the row and column address counters 25 and 26 are both at 0, the first image data bit is written to the location (0, 0) in the image RAM 11.

The memory read/write timing controller 22 outputs a count clock signal every time a one-bit data unit is written to the image RAM 11. The count clock signal is sent through the selector 27 to the address counter selected thereby (i.e., column address counter 26 when data are in the raster direction). The count clock signal increments the column address counter 26 so as to update the memory address.

After memory address update, step 93 is reached. In step 93, a check is made to see if the value on the column address counter has reached 2,047. The above write steps are repeated until the value of 2,047 is reached. That is, the next one-bit data unit is written to the location (0, 1) in the image RAM 11. In this manner, one word made of image data bits D15 through D0 received by the bus timing controller 21 is written one bit at a time to the image RAM 11, i.e., bit D15 to (0, 0), D14 to (0, 1) , . . . , and D0 to (0, 15).

With one word of image data written to the image RAM 11, the bus timing controller 21 changes status and requests the CPU 3 to forward the next one word of image data. As described above, the next one word received by the bus timing controller 21 is written one bit at a time to the image RAM 11. The word data thus written are mapped as follows: D15 written to (0, 16), D14 to (0, 17), ..., and D0 to (0, 31). With the 256th word, bit D15 is written to (0, 2,032), D14 to (0,2,033), ..., and D0 to (0, 2,047).

When the last bit of the 256th word is written and the address is updated, the value of the column address counter 26 exceeds the maximum countable value of 2,047. At that point, step 93 is followed by step 94. In step 94, the column address counter 26 outputs the carry signal that is forwarded via the second selector 32 to the row address counter 25. Upon receipt of the carry signal, the row address counter 25 is incremented by 1. The column address counter 26 is reset to 0. In step 95, a check is made to see if the row address counter 25 has reached 127. If the value of 127 has yet to be reached, the above write steps are repeated. In that case, the 257th word is also written one bit at a time to the image RAM 11, with bit D15 written to (1, 0), D14 to (1, 1), ..., and D0 to (1, 15).

The image data in the raster direction are written to the image RAM 11 in the manner described. When the writing of the 16,384th word is completed, bit D15 is written to (127, 2,032), D14 to (127, 2,033), ..., D1 to (127, 2,046), and D0 to (127, 2,047). Thus the designated number of data units have been written.

FIG. 10 is a view showing how image data in the raster direction are written to the image RAM 11. The numbers in the figure indicate the order in which data units are written. That is, the image data in the raster direction are written to the image RAM 11 in the numbered order shown in FIG. 10.

When all image data have been written and step 95 is reached, a check is made to see if the column address counter 26 and the row address counter 25 have attained 2,047 and 127, respectively. If these values are found to be attained, step 96 is reached. In step 96, the comparator in the mode setting register 24 detects the end of the write operation. A flag in the bus timing controller 21 notifies the CPU 3 of the end of printing. In turn, the CPU 3 sets read mode to the memory read/write timing controller 22 via the mode setting register 24.

The image data in the raster direction are read in the same manner as those in the vector direction. This is because the image data are written in the same format to the image RAM 11 whether the transferred data are in the vector direction or in the raster direction. Thus the description of the read operation is omitted herein.

Figure 13:
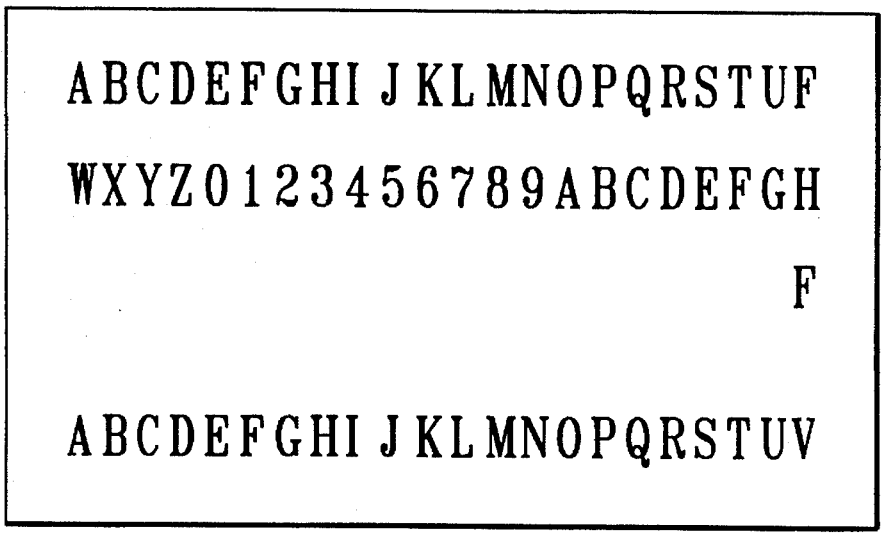
FIG. 13 is an illustration of print results that need to be obtained.
Figure 14:
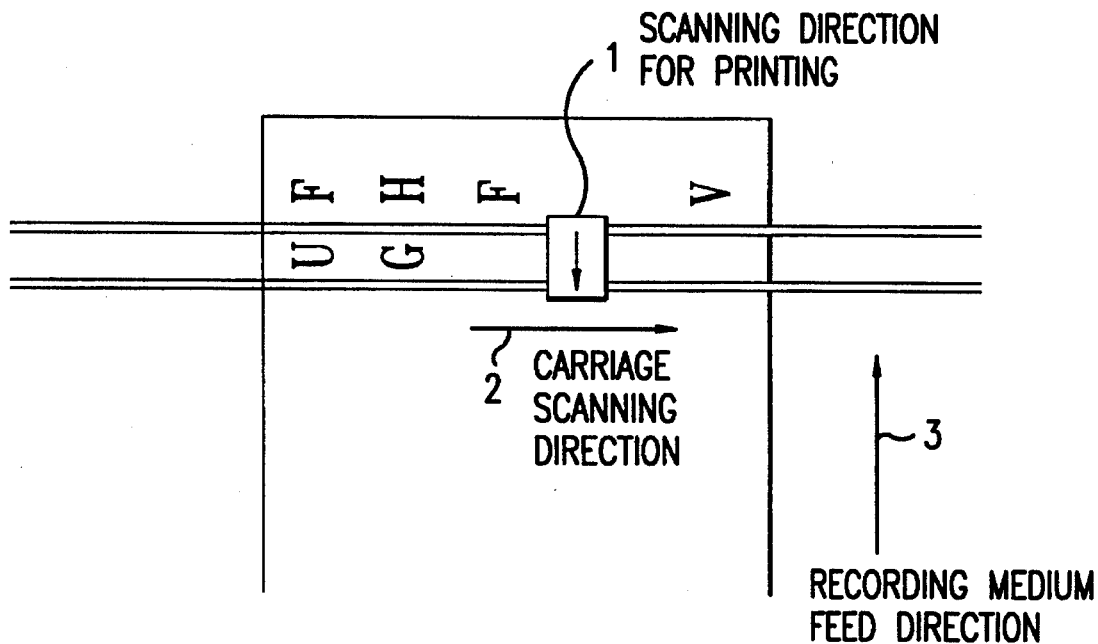
FIG. 14 is a view showing how data are printed when rotated by 90 degrees.

How font data are converted in format will now be described. FIG. 13 is an illustration of print results that need to be obtained. Printing over such a wide extent may not be available on some recording apparatuses because of the lack of their printable widths. In such cases, target images are rotated by 90 degrees and printed on the recording medium in its longitudinal direction. FIG. 14 is a view showing how data are printed when rotated by 90 degrees. In FIG. 14, each character is rotated 90 degrees counterclockwise before being printed on the recording medium that is transported in the longitudinal direction. In this case, the characters to be printed are transferred as code data from the host computer 2 or from like sources. On receiving the code data, the CPU 3 converts the positional arrangement of the coded characters so as to rotate them by 90 degrees, selects the characters in the order of printing, and sends to the memory controller 10 the fonts corresponding to the characters along with applicable print position data.

FIG. 15 is a set of views showing a font structure used by the embodiment. This font structure, made of 24 by 24 dots, is stored in the font ROM 5 and is called up by the CPU 3. Each font bit corresponds to one dot. Three bytes consisting of 24 bits are arranged crosswise. In the lengthwise direction are 72 bytes composed of 24 rows each containing 3 bytes. For example, a character "F" is stored as illustrated in FIG. 15 (B). In FIG. 15 (A), black parts stand for 1's and white parts for 0's. Such font data are read from the font ROM 5 as data in the raster direction for transfer to the image RAM 11.

Figures 16, 17:
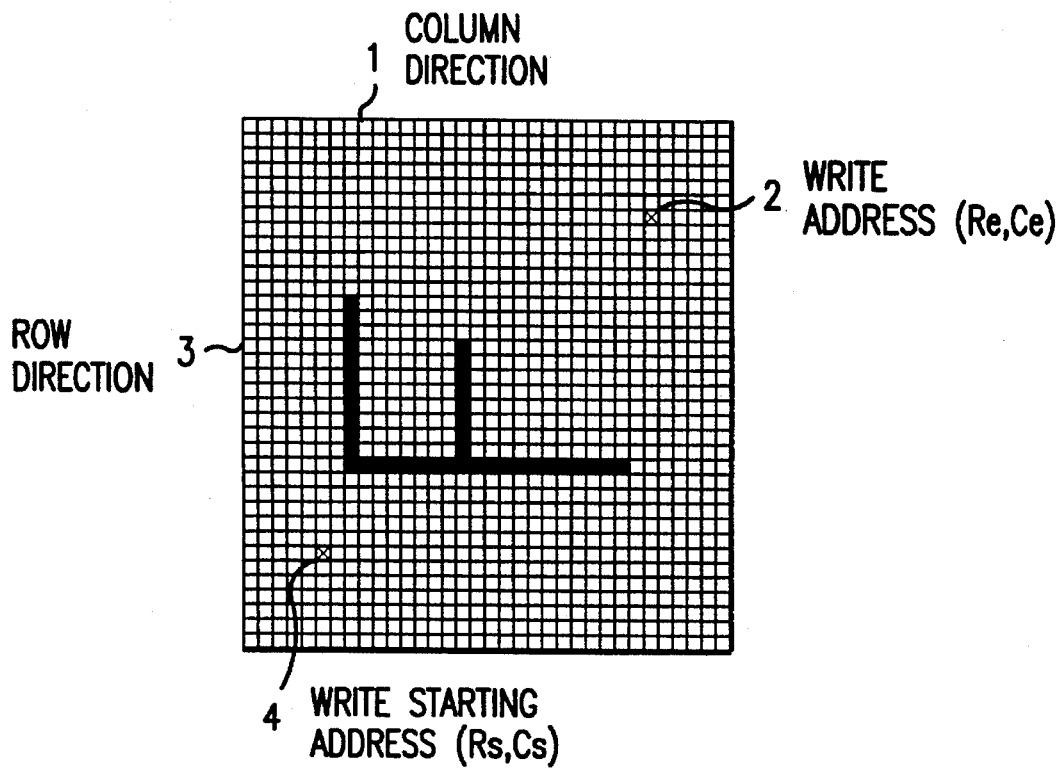
FIG. 16 is a view of an image in the image RAM having received the font data representing the image.
FIG. 17 is a view of scanning directions for read and write operations available with the embodiment.
Figure 18:
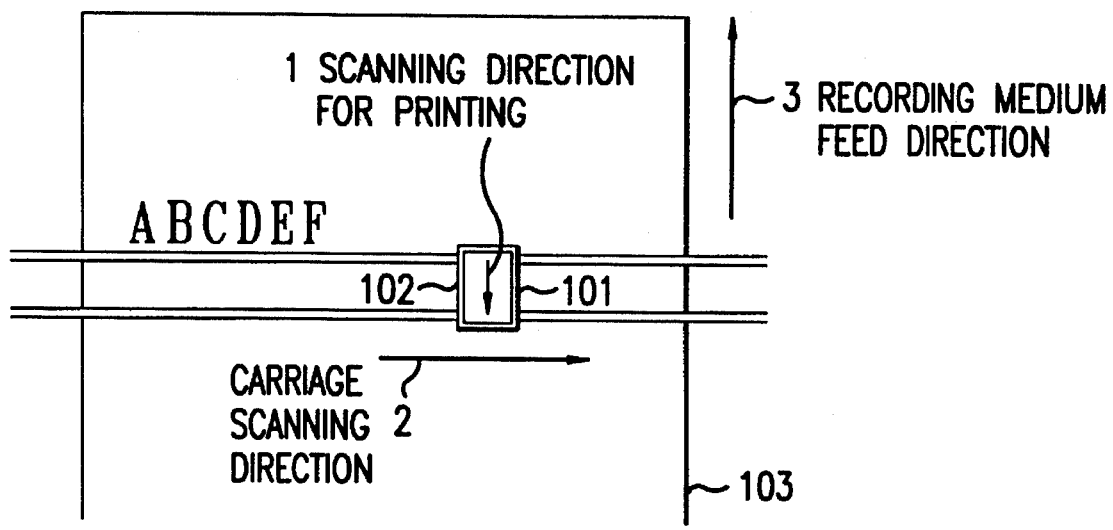
FIG. 18 is a schematic plan view of a recorder included a typical serial recording apparatus.

FIG. 16 is a view of an image in the image RAM having received the font data representing that image. In the image RAM 11, the font such as is shown in FIG. 15 (B) needs to be rotated 90 degrees counterclockwise so that the transferred font data are written in the vector direction, from bottom to top, in an area ranging from the write starting address (Rs, Cs) to the write end address (Re, Ce).

The CPU 3 sets the mode setting register 24 in the same manner as with image data in the vector or raster direction. In that case, the row address counter 25 is set to decrement. The transferred font, although composed of image data in the raster direction, is written as image data in the vector direction for the 90-degree rotation. The operation modes of the parts involved are set according to the data set in the mode setting register 24. The row address counter 25 and column address counter 26 are set to the write starting address (Rs, Cs). Also established is the write end address (Re, Ce) for comparison by the comparator in the mode setting register 24.

The settings in the selector 27 are made the same as those in the vector direction. That is, in the selector 27, the first selector 31 switches to the row address counter 25, the second selector 32 switches to the first selector 31, and the row address counter 25 is set to receive timing signals from the memory read/write timing controller 22. The third selector 33 is set to receive the carry signal from the row address counter 25, and the column address counter 26 is set to count the carry signal from the row address counter 25. In this setup, the carry signal is output by the row address counter 25 depending on the result of the comparison with the write end address made by the comparator in the mode setting register 24.

With the mode settings completed, actual image data start to be written. When a font is transferred over the common bus 18, the bus timing controller 21 stores temporarily the image data about the font in its internal data register. With the image data received, a write request is sent to the memory read/write timing controller 22.

The memory read/write timing controller 22 writes the image data one bit at a time to the image RAM 11. Since the row address counter 25 and column address counter 26 are initially set at the write starting address (Rs, Cs), the first bit of the font data is written to the location (Rs, Cs) in the image RAM 11.

The memory read/write timing controller 22 outputs a count clock signal every time a one-bit data unit is written to the image RAM 11. The count clock signal is sent through the selector 27 to the row address counter 25. The count clock signal decrements the row address counter 25 so as to update the memory address.

After memory address update, the next bit is written to the image RAM 11. The write steps are repeated until the value on the row address counter 25 reaches the write end address Re. Specifically, the next data bit is written to the location (Rs-1, Cs) in the image RAM 11. In this manner, one image data byte made of bits D7 through D0 received by the bus timing controller 21 are written to the image RAM 11 one bit at a time, i.e., D7 written to (Rs, Cs), D6 to (Rs-1, Cs), . . . , and D0 (Rs-7, Cs).

When the last bit of the third byte has been written and the address is updated, the row address counter 25 is incremented to exceed the write end address Re. At that point, the row address counter 25 outputs the carry signal that is input to the column address counter 26 via the third selector 33. Given the carry signal, the column address counter 26 is incremented to reach Cs+1. The row address counter 25 is reset to the write starting address Rs. Thus the font is written, from bottom to top in the raster direction, to the image RAM 11 until 72 bytes of data have been written.

When one font has been written, the CPU 3 checks to see if there exist other fonts or image data to be written. If there do exist such data, the above write steps are repeated. When the data to be written have been exhausted, read mode is established so as to print the image data written in the image RAM 11. The read operation is the same as that for image data in the raster direction, and the description of the operation is omitted herein.

Even when the characters are rotated by 90 degrees for printing, the embodiment of the invention causes the rotation to be performed at high speed. The embodiment also allows image data to be recorded, i.e., read out at high speed under the same kind of control as on data of other formats.

In the description above, the image data were shown to be arranged in the vector direction, raster direction, and vector direction from bottom to top. Alternatively, any one of eight write/scan directions is made available by changing the increment or decrement setting for the row address counter 25 and column address counter 26 as well as by having the selector 27 select the appropriate address counter for supplying count pulses. Similar changes in the read direction are also available. For example, a recording apparatus that requires print data in the raster direction may be so controlled as to read out print data in the raster direction. The settings for this case may be made the same as those for the write operation in the raster direction. FIG. 17 is a view of scanning directions for read and write operations available with the embodiment. In FIG. 17, the straight line arrows indicate write or read directions, and the wavy arrows denote scanning directions. For example, a box W1 shows the scanning direction for the above-mentioned data write operation in the raster direction. A box W5 indicates the scanning direction for the data write operation in the vector direction; a box W6 denotes the scanning direction for writing fonts after 90-degree rotation; and a box R5 depicts the scanning direction for the read operation on the above-described serial printer. A printer carrying out bi-directional printing may use a mode of R8 in which read scan is performed from right to left. These modes are used selectively to write and read data to and from the image RAM 11. Because the row address counter 25 and column address counter 26 are incremented or decremented independently of each other, any input or output data may be converted in format with ease, as shown in FIG. 17.

Although the above description has centered primarily on ink jet printer systems, it also applies to other serial printer systems as well as to such printing apparatuses as facsimile machines and copiers that employ serial printer systems.

As described, the invention allows print data to be converted at high speed to any format matching the print head furnished regardless of the current format of the data to be written and whether or not the print data need to be rotated before printing. With a one-bit format memory used as the image RAM, the circuits downstream of the data read controller are significantly simplified in construction.

As many apparently different embodiments of this invention may be made without departing from the spirit and scope thereof, it is to be understood that the invention is not limited to the specific embodiments thereof except as defined in the appended claims.

What is claimed is:

1. A recording apparatus having a head mounted on a carriage moving relatively to a recording medium, said head printing one column substantially perpendicular to the direction in which said carriage moves so as to print a single line, said recording apparatus comprising:

a storage device for storing print data in units of bits and for allowing any of said print data to be accessed in units of bits by an X address and a Y address;

an X address counter for designating said X address in said storage device;

a Y address counter for designating said Y address in said storage device;

a mode setting register for storing write mode data;

a memory read/write timing controller for generating a plurality of timing signals for writing and reading to and from said storage device;

a bus timing controller for outputting print data in units of bits in accordance with the content of said mode setting register upon receipt of print data in units of words; and a selector for supplying any one of said X address counter and said Y address counter with said timing signals in accordance with the content of said mode setting register, said selector further sending a carry signal from the address counter having received said timing signals to the address counter not receiving said timing signals.

2. A recording apparatus having a head mounted on a carriage moving relatively to a recording medium, said head printing one column substantially perpendicular to the direction in which said carriage moves so as to print a single line, said recording apparatus comprising:

a storage device for storing print data in units of bits and for allowing any of said print data to be accessed in units of bits by an X address and a Y address;

an X address counter for designating said X address in said storage device;

a Y address counter for designating said Y address in said storage device;

a mode setting register for storing write mode data;

a memory read/write timing controller for generating a plurality of timing signals for writing and reading to and from said storage device;

font storage means for storing font images;

control means for receiving text data from outside said recording apparatus, for changing the printing order of said text data as needed according to a current print direction, for causing said font storage means to output a font image based on said text data onto a bus, for setting write mode data in said mode setting register, and for controlling relevant parts of said recording apparatus accordingly;

a bus timing controller for outputting print data in units of bits in accordance with the content of said mode setting register upon receipt of said font image from said bus; and a selector for supplying any one of said X address counter and said Y address counter with said timing signals in accordance with the content of said mode setting register, said selector further sending a carry signal from the address counter having received said timing signals to the address counter not receiving said timing signals.

3. A recording apparatus according to claim 1, wherein said storage device is a dynamic random access memory used as an image RAM having a two-dimensional arrangement of pluralities of storage elements in the X and Y directions, each element being one bit long and accessed independently by a combination of said X address counter and said Y address counter.

4. A recording apparatus according to claim 1, wherein said storage device is sequentially accessible in any one of the X and Y directions.

5. A recording apparatus according to claim 1, wherein the maximum value of said X address is set to the number of nozzles mounted on said head, and the maximum value of said Y address is set to a maximum width composed of dots printable by said carriage in motion, each dot being equivalent to one bit.

6. A recording apparatus according to claim 1, wherein said memory read/write timing controller includes any one of two functions, one function causing the data read from said storage device to be deleted to eliminate the need for subsequent clearing of data from said storage device, the other function allowing the read-out data to be retained for quality image formation by a plurality of scans.

7. A recording apparatus according to claim 1, wherein said head comprises a plurality of recording heads for color printing.

8. A recording apparatus according to claim 2, wherein said control means rotates said print data substantially by 90 degrees counterclockwise prior to printing.

9. A recording apparatus according to claim 2, wherein said print data are written to and read from said storage device in any one of a plurality of combinations of storage access and scan directions made available by selectively operating said X address counter, said Y address counter and said selector.

* * * * *